April 21, 1953      S. D. ROSS      2,636,074
STABILIZED HALOGENATED DIELECTRIC MATERIAL
Filed Sept. 17, 1949
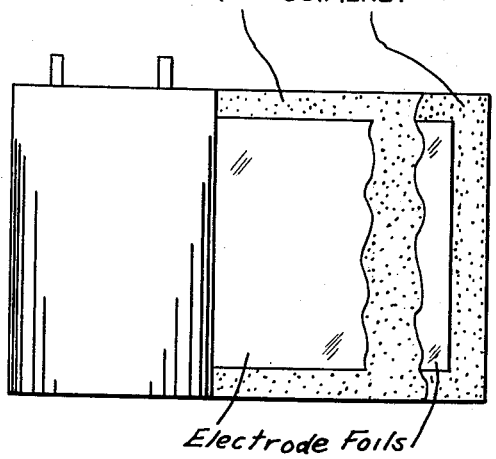
Dielectric Spacers Impregnated With An Halogenated Organic Dielectric Compound And Allo-ocimene.
Electrode Foils
SIDNEY D. ROSS
INVENTOR.

Patented Apr. 21, 1953

2,636,074

UNITED STATES PATENT OFFICE 2,636,074

STABILIZED HALOGENATED DIELECTRIC MATERIAL

Sidney D. Ross, North Adams, Mass., assignor to Sprague Electric Company, North Adams, Mass., a corporation of Massachusetts Application September 17, 1949, Serial No. 116,348

1 Claim. (Cl. 175—41)

My invention relates to the stabilization of halogenated organic compounds. More particularly, it concerns dielectric compositions composed of such halogenated compounds to which relatively small amounts of certain stabilizing agents have been added. It also concerns electrical devices, especially capacitors, in which metal conductors are insulated with such dielectric compositions.

Halogenated organic compounds, such as chlorinated diphenyl and chlorinated naphthalene, are known to be very useful electrical insulating materials, because of their rleatively high thermal stability, resistance to oxidation, low conductivity, non-inflammability and other valuable properties. The two halogenated aromatic compounds specifically mentioned above are widely used commercially as dielectric materials for various electrical devices, particularly as impregnants in electrical capacitors. Unfortunately, dielectric compositions containing such halogenated compounds often deteriorate at a relatively high rate, particularly when exposed to elevated temperatures, high electrical stresses, or both. This deterioration may be noted as an increase in the leakage current of direct current capacitors or as an increase in the power factor of alternating current capacitors. The deterioration ultimately results in the complete breakdown of the dielectric and a resultant short circuit of the capacitor or other electrical device.

To overcome this instability of the halogenated organic compounds or to minimize the deleterious effects thereof, a number of so-called stabilizers have been proposed. These include a wide variety of inorganic and organic chemicals that are more or less effective for their purpose.

In the case of electrical capacitors, the dielectric impregnant is in contact with the metal electrodes which are usually made of aluminum foils. If, during the deterioration of the chlorinated hydrocarbon, hydrogen chloride is evolved, it appears that aluminum chloride is produced by reaction of the acid with the metal of the foils.

If aluminum chloride is formed, there are, of course, many further reactions that may ensue, which destroy the dielectric properties of the insulating material. Thus the so-called stabilizer must be particularly effective in the presence of such metals as are customarily employed in electrical devices.

It is an object of this present invention to overcome the foregoing and related disadvantages of the halogenated dielectric materials. A further object is to improve the performance of halogenated aromatic insulating compounds. A still further object is to produce electrical capacitors, impregnated with halogen containing dielectric materials, which are stable under high temperatures and electrical stresses.

These objects are attained in accordance with the present invention by adding to the halogenated dielectric material a small proportion of a compound conforming to the general formula

wherein R, R' and R'' are selected from the class containing hydrogen and hydrocarbon radicals and M is a conjugated hydrocarbon system.

In a more restricted sense, this invention is concerned with an electrical capacitor comprising aluminum electrodes separated by a porous dielectric substance impregnated with a chlorinated aromatic hydrocarbon admixed with a small proportion of a compound selected from the group containing Di-allyl benzene
Di-crotyl benzene
Cinnamyl phenyl methane
Di-cinnamyl methane
1-phenyl pentadiene-1,3
1,4-diphenyl butene-2
Allo-ocimene
Alpha-pyronene
Beta-pyronene In one of its preferred embodiments the invention is concerned with a dielectric material comprising chlorinated naphthalene having dissolved therein between about 0.1% and about 5% allo-ocimene. In another of its preferred embodiments, the invention is concerned with chlorinated diphenyl having dissolved therein between about 0.1% and about 5% 1-phenyl pentadiene-1,3.

According to my invention, I have discovered that halogenated organic compounds, particularly the chlorinated aromatic compounds may be rendered stable in the presence of metal under conditions of high temperature and electrical stress by treatment thereof with compounds possessing the structure set forth in the foregoing general formula. The deterioration to which the halogenated compounds are normally subject is substantially entirely prevented by the inclusion of relatively small amounts of these compounds, of which allo-ocimene is a preferred example. While I am not fully aware of the reason therefor, it may be that these structures are such that the residue formed by removal of hydrogen as an ion or as a radical is extensively stabilized by resonance. For optimum results, the conjugated compound should possess at least ten carbon atoms.

The compounds are generally employed in amounts from about 0.1% to about 5% of the weight of the chlorinated compound. For electrical capacitor applications, in which long periods at elevated temperatures are encountered, the preferred range of concentration is from about 2% to about 5%.

My invention makes possible the use of chlorinated aromatic compounds and other halogenated compounds in electrical capacitors, transformers, circuit breakers and related devices in which the instability of such compounds has heretofore discouraged their use.

The invention finds particular use in the manufacture of electrical capacitors impregnated with chlorinated naphthalene or chlorinated diphenyl. The former is a wax-like solid melting at 95° C., and the latter is a very viscous liquid, both compounds containing between about 50% and about 60% of chlorine.

Reference may be made to the appended drawing which shows a capacitor of the rolled type to which the present invention is applicable. It is made up of two thin aluminum foils separated by a porous dielectric spacing material, such as kraft paper, which is impregnated with a halogenated compound containing a small proportion of one or more of the compounds of the invention, the interleaved sheets being rolled into the form shown in the drawing.

Representative electrical capacitors have been produced with two aluminum foils separated by sheets of calendered kraft paper with a total thickness of 0.0009". These have been impregnated with chlorinated naphthalene wax containing 2% paraffin to produce units rated at 400 volts D.C. continuous operation. Life tests conducted at 65° C. and 85° C. at one and one-half times the rated voltage, e. g. 600 volts, result in failure of over 30% of the condensers at 65° C. within 500 hours and over 80% of the condensers at 85° C. within 500 hours.

In contrast, four sets of identical condensers were made up with the following impregnants:

(a) 93% chlorinated naphthalene - 5% allo-ocimene - 2% paraffin
(b) 94% chlorinated naphthalene - 4% 1-phenyl pentadiene-1,3 - 2% paraffin
(c) 93% chlorinated naphthalene - 5% p-dicrotyl benzene - 2% paraffin
(d) 95% chlorinated naphthalene - 3% beta-pyrenone - 2% paraffin These sets (ten in each set) were operated at 600 volts at 85° C. for 500 hours. No failures occurred in the (b) and (c) sets and only one failure occurred in the (a) and (d) sets. These failures occurred after 300 hours.

The Radio Manufacturers Association Specification 159B for non-metal encased D.C. tubular condensers calls for 250 hours at 1.5 times rated voltage at 85° C. without failure and the condensers of the invention (described above) meet this specification.

In contrast to other compounds previously proposed for this purpose, my materials are all hydrocarbons. As a result, the electrical properties of the dielectric impregnant are not deleteriously affected by the addition of the stabilizing materials. Anthraquinone, and similar prior art additives, while more or less effective in preventing rapid deterioration of the halogenated dielectric, result in increased electrical losses in the dielectric.

Percentages of 2.0% to 5.0% have been found very effective, and the inhibition or stabilizing action is apparent at concentrations of 0.1% or even less.

While the above description has been particularly concerned with electrical capacitors, it has been found that the inhibition or stabilizing action described herein is applicable to other electrical devices, particularly those subjected to high voltages and temperatures.

It is contemplated that the stabilizers of my invention may be added to halogenated aliphatic hydrocarbons, halogenated alicyclic hydrocarbons, halogenated aromatic ethers, halogenated oxygen containing heterocycles and to other halogen containing compounds which display a tendency to deteriorate under exposure to high temperature and/or high electrical stress.

The solubility of the compounds described above in the halogenated compounds, particularly halogenated aromatic hydrocarbons, is satisfactory, and for practical purposes it is usually desirable to incorporate the compounds in the dielectric impregnants prior to impregnation into the capacitor.

As many different embodiments of this invention may be made without departing from the spirit and scope hereof, it is to be understood that the invention is not limited to the specific embodiments hereof except as defined in the appended claim.

What I claim is:

An electrical capacitor comprising aluminum electrodes separated by a porous dielectric substance impregnated with a chlorinated aromatic hydrocarbon admixed with about 0.1 to about 5% of allo-ocimene.

SIDNEY D. ROSS.

References Cited in the file of this patent

UNITED STATES PATENTS

| Number | Name | Date |
|---|---|---|
| 2,105,407 | Clark | Jan. 11, 1938 |
| 2,358,628 | Clark | Sept. 19, 1944 |
| 2,377,630 | Hyde | June 5, 1945 |